United States Patent [19]

Siesholtz et al.

[11] Patent Number: 5,144,717
[45] Date of Patent: Sep. 8, 1992

[54] DOUBLE WHEEL CASTER FOR BEING ROTATABLY MOUNTED ON A LEG OF A TRANSPORT CARRIER

[75] Inventors: Devon T. Siesholtz, Boyertown; Nathaniel Saint, Morgantown, both of Pa.

[73] Assignee: Graco Metal Products, Inc., Elverson, Pa.

[21] Appl. No.: 691,948

[22] Filed: Apr. 26, 1991

[51] Int. Cl.⁵ .............................................. A47B 91/00
[52] U.S. Cl. ....................................... 16/47; 16/35 D; 16/38
[58] Field of Search .................... 16/47, 48, 46, 45, 37, 16/38, 30, 31 R, 25, 35 D

[56] References Cited

U.S. PATENT DOCUMENTS

| 1,015,572 | 1/1912 | Maier . | |
|---|---|---|---|
| 1,402,191 | 1/1922 | Thiele . | |
| 1,902,726 | 3/1933 | Schacht . | |
| 2,995,770 | 8/1961 | Mullikin | 16/21 |
| 3,648,325 | 3/1972 | Cartwright et al. | 16/46 |
| 4,153,303 | 5/1979 | Tanner | 301/63 PW |
| 4,173,810 | 11/1979 | James | 16/47 |
| 4,348,785 | 9/1982 | Jordan | 16/46 |
| 4,351,084 | 9/1982 | Fontana | 16/45 |
| 4,377,883 | 3/1983 | Folson | 16/47 |
| 4,399,586 | 8/1983 | McCarroll | 16/31 R |
| 4,544,425 | 10/1985 | Provolo | 156/73.1 |
| 4,759,098 | 7/1988 | Ko | 16/47 |
| 4,839,938 | 6/1989 | Coggin et al. | 16/45 |

FOREIGN PATENT DOCUMENTS

| 2404903 | 8/1975 | Fed. Rep. of Germany . | |
| 2532891 | 2/1977 | Fed. Rep. of Germany . | |
| 2638877 | 3/1977 | Fed. Rep. of Germany | 16/45 |
| 861883 | 3/1961 | United Kingdom | 16/47 |

Primary Examiner—Lowell A. Larson
Assistant Examiner—Michael J. McKeon
Attorney, Agent, or Firm—Panitch Schwarze Jacobs & Nadel

[57] ABSTRACT

A double wheel caster for being rotatably mounted on a leg of a transport carrier includes a support rod having a center portion and opposite first and second end portions. The center portion of the support rod is rotatably positioned within an opening located in a wheel caster trailing housing. A pair of caster wheels are rotatably positioned on the first and second end portions of the support rod. Each caster wheel has an aperture generally centrally located therethrough and a plurality of fingers extending radially inward and into engagement with the support rod such that the caster wheels are frictionally mounted on the support rod. Upon movement of the transport carrier in a direction which forces one caster wheel to rotate faster than the other, the frictional mounting inhibits the one caster from freely rotating with respect to the other to thereby prevent shimmying.

14 Claims, 3 Drawing Sheets

DOUBLE WHEEL CASTER FOR BEING ROTATABLY MOUNTED ON A LEG OF A TRANSPORT CARRIER

FIELD OF THE INVENTION

The present invention relates to a caster wheel and, more particularly, to a double wheel caster for being rotatably mounted on the leg of a transport carrier.

BACKGROUND OF THE INVENTION

Many transport carriers, such as baby strollers, baby carriages and grocery carts are equipped with double wheel casters which provide greater ease and mobility when turning corners. The double caster wheels cause the transport carrier to be easier to push and provide greater stability to the transport carrier. However, prior art double wheel casters have a tendency to shimmy when the wheel speed exceeds a certain velocity. This could cause the transport carrier to become difficult to maneuver. Furthermore, undesirable vibrations may agitate the infant to the point where the infant has to be hand carried.

Prior art double wheel casters typically have their wheels freely rotatably supported on a support rod which is rotatably mounted on the carrier. Each wheel is capable of freely rotating on the support rod and with respect to each other. When a carrier is turning a corner at a relatively fast velocity, one of the wheels of the double wheel caster tends to turn at a much greater velocity than the other wheel which causes the wheels to shimmy. In addition, in some circumstances, the prior art double wheels tend to shimmy when the carrier is traveling in a linear direction and has achieved a certain velocity. It is believed that the shimmying results during linear travel are due to the inherent instability of the wheel system. The shimmying of the wheels is caused by one wheel turning much faster than the other wheel, then the other wheel turns faster than the one wheel, and so forth.

As mentioned previously, the shimmying of the wheels causes the entire carrier to vibrate and become difficult to maneuver. Therefore, there is a need for a double wheel caster which does not shimmy when turning corners or during linear travel.

The present invention overcomes many of the disadvantages inherent in the above-described double wheel casters by providing a double wheel caster wherein the support rod is rotatably mounted on the carrier and the caster wheels are mounted on the support rod with a slight press or friction fit. In the present invention, the wheels rotate in unison with the support rod because of the friction fit. The friction fit inhibits but does not prevent the wheels from rotating with respect to each other to thereby prevent one wheel from turning significantly faster than the other to reduce or prevent shimmying. Consequently, use of the present invention results in a stable transport carrier which does not shimmy during linear or arcuate travel.

SUMMARY OF THE INVENTION

Briefly stated, the present invention relates to a double wheel caster for being rotatably mounted on a leg of a transport carrier. The double wheel caster comprises a trailing housing having a generally cylindrical opening extending therethrough at one end thereof and a support rod having a center portion and opposite first and second end portions. The opening is complementarily sized for rotatably receiving the center portion of the support rod. The center portion of the support rod is rotatably positioned within the opening located in the wheel caster trailing housing. A first caster wheel has an aperture generally centrally disposed therethrough which defines a generally cylindrical surface. The aperture rotatably receives the first end portion of the support rod. The first caster wheel is rotatably positioned on the first end portion of the support rod such that a first gap exists between the first end portion of the support rod and the cylindrical surface. A first bushing means is positioned within the first gap for frictionally engaging the first end portion of the support rod and the cylindrical surface of the first caster wheel. A second caster wheel has an aperture generally centrally disposed therethrough which defines a generally cylindrical surface. The aperture rotatably receives the second end portion of the support rod. The second caster wheel is rotatably positioned on the second end portion of the support rod such that a second gap exists between the second end portion of the support rod and the cylindrical surface. A second bushing means is positioned within the second gap for frictionally engaging the second end portion of the support rod and the cylindrical surface of the second caster wheel. Upon movement of the transport carrier, the first caster wheel, the second caster wheel and the support rod rotate together with respect to the trailing housing. Upon movement of the transport carrier in a direction which forces one caster wheel to rotate faster than the other, the first and second bushing means frictionally inhibits the one caster wheel from freely rotating with respect to the other to thereby prevent shimmying.

BRIEF DESCRIPTION OF THE DRAWINGS

The foregoing summary, as well as the following detailed description, will be better understood when read in conjunction with the appended drawings For the purpose of illustrating the invention, the embodiments which are presently preferred are shown in the drawings. It is understood, however, that this invention is not limited to the precise arrangements and instrumentalities shown.

In the drawings.

DESCRIPTION OF THE PREFERRED EMBODIMENTS

Figure 1:
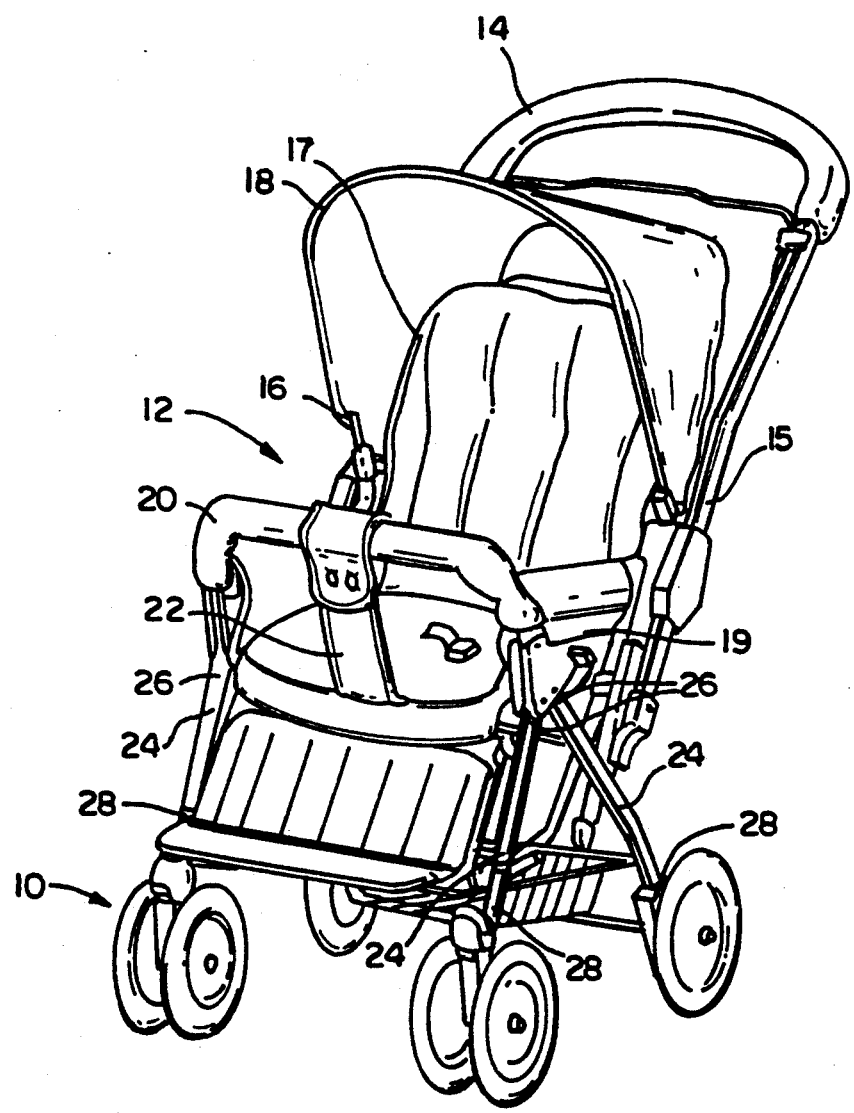
FIG. 1 is a perspective view of an infant stroller having double wheel casters in accordance with the present invention.

Certain terminology is used in the following description for convenience and is not limiting. The words "right," "left," "lower" and "upper" designate directions in the drawings to which reference is made. The words "inwardly" and "outwardly" refer to directions toward and away from, respectively, the geometric center of the double caster wheel and designated parts thereof. The terminology includes the words above specifically mentioned, derivatives thereof and words of similar import.

Referring to the drawings in detail, wherein like numerals indicate like elements throughout, there is shown in FIGS. 1 through 6 a preferred embodiment of a double wheel caster 10 in accordance with the present invention.

FIG. 1 illustrates a preferred embodiment of a double wheel caster 10 attached to a transport carrier for carrying and transporting at least one object. In the present embodiment, it is preferred that the transport carrier be comprised of an infant stroller 12 which is typically used to carry an infant (not shown). However, it is understood by those skilled in the art that the present invention is not limited to the infant stroller 12 or any other particular type of transport carrier and that the double wheel caster 10 can be mounted on any type of transport carrier including an infant carriage, a toy carriage, a wagon or a grocery cart.

As shown in FIG. 1, the stroller 12 includes carrying means for receiving an object, preferably an infant. In the present embodiment, it is preferred that the carrying means be comprised of the main body 16 of the stroller 12 which preferably includes a frame 15 having a handle 14 extending outwardly therefrom. The frame 15 includes a seat 17 for receiving the infant. Side walls 19 extend from the seat 17 and are supported by the frame 15 of the stroller. A canopy 18 is attached to the upper portion of the main body 16 for providing shade to the infant. A front crossbar 20 extends across the front portion of the main body 16 of the stroller 12 to provide an opening for receiving the infant's legs. A strap 22 bisects the crossbar 20 such that each leg is received by an individual opening.

Figure 2:
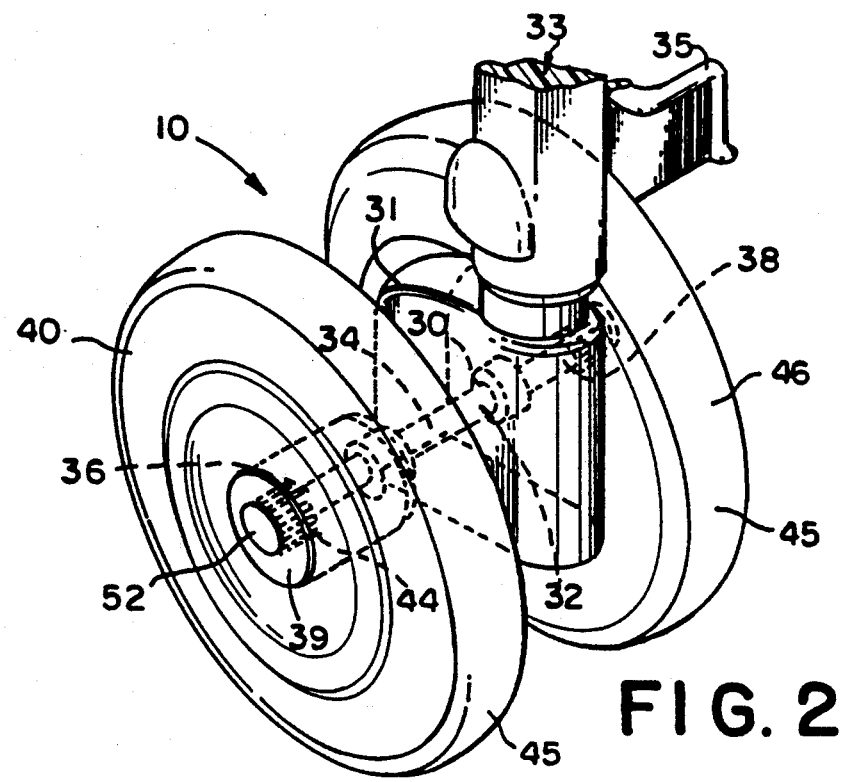
FIG. 2 is a greatly enlarged perspective view of a double wheel caster shown in FIG. 1.
Figure 3:
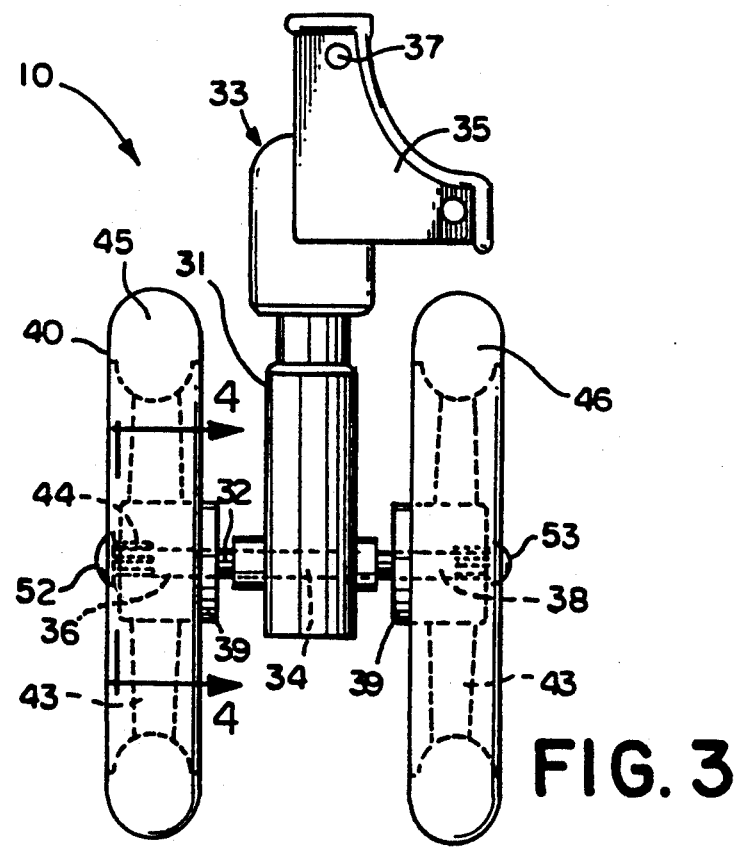
FIG. 3 is a front elevational view of the double wheel caster shown in FIG. 2.
Figure 4:
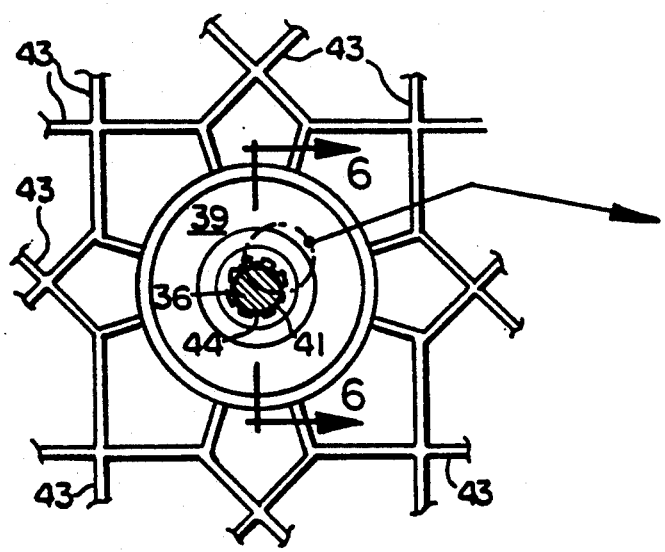
FIG. 4 is an enlarged cross-sectional view of the double wheel caster of FIG. 3 taken along line 4—4 of FIG. 3.

The stroller 12 includes four legs 24 extending downwardly therefrom. Each leg 24 has a first end portion 26 and a second end portion 28. The first end portion 26 of each leg 24 is attached to a portion of the carrying means or main body 16 of the stroller 12 and extends downwardly therefrom. The first end portion 26 of each leg 2 preferably, but not necessarily, extends from the frame 15 of the main body 16 of the stroller 12. As shown in FIGS. 2 and 3, the second end portion 28 of the leg 24 is attached to a wheel caster 10 by any suitable means, such as screws or bolts.

While in the present embodiment, it is preferred that the stroller 1 include four legs 24, it is understood by those skilled in the art that any number of legs could depend downwardly from the stroller 12 so long as the stroller is stable. For instance, three, five or six legs could be used without departing from the spirit and scope of the invention.

In the present embodiment, it is preferred that the legs 24 be constructed of a high strength light weight material, such as aluminum. However, it is understood by those skilled in the art that the legs 24 can be constructed of other materials, including polymers.

Referring to FIGS. 2 and 3, the wheel caster 10 includes a trailing housing 31 having a generally cylindrical opening 30 extending therethrough at one end thereof. The trailing housing 31 is rotatably attached to the support leg 33 by any suitable means which is well-known to those skilled in the art. The support leg 33 includes a mounting portion 35 for receiving the second end portion 28 of the leg 24 of the transport carrier. At least one opening 37 is located on the mounting portion 35 for receiving a fastening means (not shown) for securing the second end portion 28 of the leg 2 to the mounting portion 35 of the support leg 33.

As mentioned previously, the present invention is not limited to any particular carrying means or stroller 12. Therefore, further description of the elements of the stroller is not necessary, and is omitted for purposes of convenience only and is not limiting.

In the present invention, it is preferred that two double wheel casters 10 be correspondingly mounted on the wheel caster support legs 33 at the front portion of the stroller 12. While the double wheel casters 10 are preferably, but not necessarily, attached to the wheel caster support legs 33 located on the front portion of the stroller 12 it is understood by the ordinarily skilled artisan that all of the wheel caster support legs or just the wheel caster support legs attached to the rear portion of the stroller 12 could receive double wheel casters.

Figure 6:
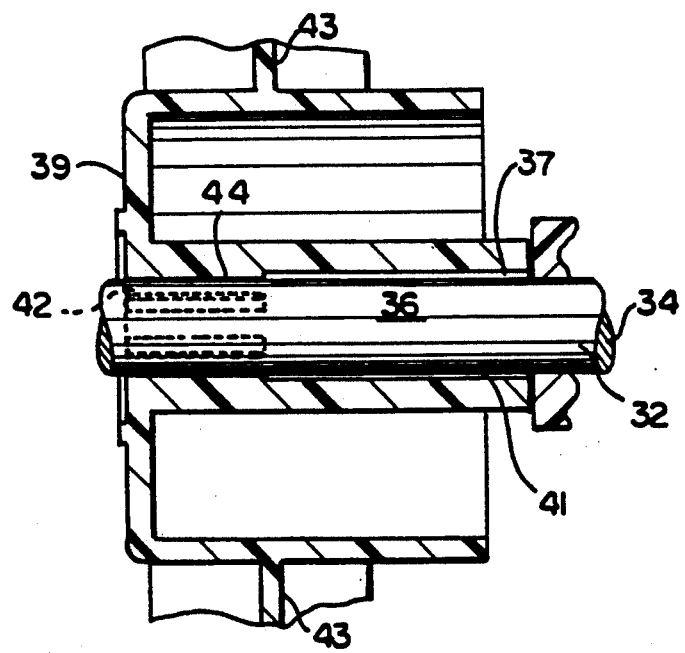
FIG. 6 is a partial cross-sectional view of the double wheel caster shown in FIG. 4 taken along line 6—6 of FIG. 4.

Referring specifically to FIGS. 2, 3 and 6, each double wheel caster 10 includes a support rod 32 having a center portion 34 and first and second end portions 36, 38, respectively. The opening 30 is complementarily sized for rotatably receiving the center portion 34 of the support rod 32. The center portion 34 of the support rod 32 is rotatably positioned within the opening 30 located in the wheel caster trailing housing 31. The support rod 32 is preferably generally cylindrically shaped and has a generally constant diameter. However, it is understood by those skilled in the art that the diameter of the various portions 34, 36, 38 of the support rod 32 could vary or could be stepped. For instance, the support rod 32 may have a relatively narrow center portion 34 and wider first and second end portions 36, 38 or may have a relatively wide center portion 34 and narrower first and second end portions 36, 38.

The support rod 32 is preferably made from steel, but may alternatively be made from plastic, aluminum, or any other suitable material having sufficient material strength. The outer surface of the support rod 32 is preferably smooth, but alternatively all or selected portions may have an uneven or a textured outer surface to provide further friction between the support rod 32 and the caster wheels, as described hereinafter.

Referring now to FIGS. 3–6, the double wheel caster 10 includes a first caster wheel 40 which has a generally cylindrical aperture 41 generally centrally disposed therethrough. The aperture 41 defines a generally cylindrical surface 42 which rotatably receives the first end portion 36 of the support rod 32. The first caster wheel 40 is rotatably positioned on the first end portion 36 of the support rod 32 such that a generally annular gap 37 exists between the first end portion 36 of the support rod 32 and the cylindrical surface 42.

The first caster wheel 40 is preferably constructed of a hub 39 having a webbed plastic frame 43 extending outwardly therefrom and surrounded by a tire 45 preferably formed of rubber or a similar material. However, it is understood by those skilled in the art that the first caster wheel 40 may be entirely made out of plastic, have a stainless steel frame surrounded by a rubber or plastic tire or be constructed from any other suitable material.

Figure 5:
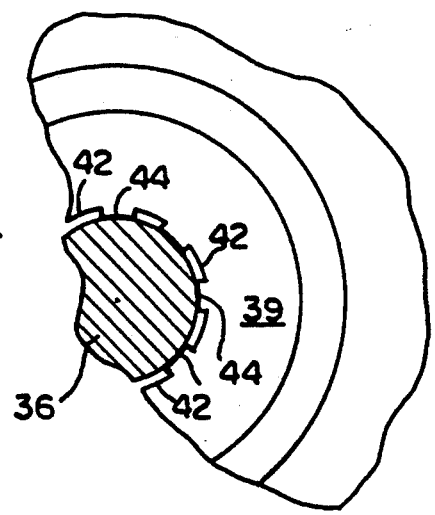
FIG. 5 is a greatly enlarged fragmentary view of a portion of the double wheel caster shown in FIG. 4.

As best shown in FIG. 5, a first bushing means is positioned within the gap 37 for frictionally engaging the first end 36 of the support rod 32 and the cylindrical surface 42 of the first caster wheel 40. In the present embodiment, it is preferred that the first bushing means be comprised of a plurality of fingers 44 circumferentially spaced around the cylindrical surface 42. The fingers 44 extend a predetermined distance radially inward and into engagement with the first end portion 36 of the support rod so that the first caster wheel 40 is frictionally mounted on the first end portion 36 of the support rod 32. The fingers 44 are preferably generally rectangular shaped in cross-section but may be hemispherical, triangular, or any other suitable shape in cross-section to provide friction between the support rod 32 and the first caster wheel 40.

As shown in FIG. 6, in the present embodiment, the fingers 44 are preferably, but not necessarily, positioned along on a portion, approximately one-third of the axial length of the cylindrical surface 42 around the circumference of the aperture 41. That is, the fingers 44 preferably extend axially from the outermost portion of the aperture 41 inward approximately one-third of the length of the aperture 41. The fingers 44 are fabricated of a resilient material and sufficiently circumferentially spaced apart so that an adequate amount of friction is produced between the first end portion 36 of the support rod 32 and the fingers 44 While it is preferred that the fingers 44 extend axially along only about one-third of the length of the cylindrical surface 42, it is understood by those skilled in the art that the fingers 44 could extend axially along the entire length of the cylindrical surface 42 or along some other fraction thereof. Also, it will be understood that while, in the present embodiment, the fingers 44 are positioned on the outermost portion of the aperture 41 they need not be and could be at some other location, such as the innermost portion. The fingers could also be at spaced locations along the length of the aperture 41, if desired.

While in the present embodiment, it is preferred that the bushing means be comprised of a plurality of fingers 44 circumferentially spaced around the cylindrical surface 42, it is understood by those skilled in the art that other means could be used for imposing a controlled amount of friction between the support rod 32 and the cylindrical surface 42 without departing from the spirit and scope of the invention. For instance, the cylindrical surface 42 could be sized to frictionally engage the support rod 32 without the use of the fingers 44.

As shown in FIG. 3, the double caster wheel 10 includes a second caster wheel 46 mounted on the second end portion 38 of the support rod 32. The structure, mounting and operation of the second caster wheel 46 and second end portion 38 are generally identical to the above-described first caster wheel 40 and first end portion 36. Accordingly, further description thereof is omitted for convenience purposes only and is not limiting.

As best shown in FIG. 3, the double wheel caster 10 includes stop means for retaining the first and second caster wheels 40, 46 on the support rod 32. The stop means is preferably attached to the axial ends of the first and second end portions 36, 38 of the support rod 32. In the present embodiment, the stop means is preferably, a pair of caps 52, 53. Each dome shaped cap 52, 53 has a diameter which is larger than the diameter of the apertures 41 of the first and second caster wheels 40, 46. The dome shaped caps 52, 53 are positioned on the distal ends of the first and second end portions 36, 38, respectively. Preferably, the dome shaped cap 52 on the first end portion 36 of the support rod 32 is integrally formed therewith and the dome shaped cap 53 on the second end portion 38 of the support end 32 is frictionally mounted thereon. While the stop means is, preferably a pair of dome shaped caps 52, 53, it is understood by those skilled in the art that other means could be used to retain the first and second wheels 40, 46 on the support rod 32, such as cotter pins (not shown).

In operation, when the stroller 12 is traveling in a linear direction, the fingers 44, located on the cylindrical surfaces 42 of the first and second caster wheels 40, 46, frictionally engage the first end and second end portions 36, 38, respectively, of the support rod 32 with a predetermined friction. The friction fit between the first and second caster wheels 40, 46 and the support rod 32 causes the first and second caster wheels 40, 46 to rotate in unison with the support rod 32. However, since the friction between the wheels 40, 46 and the support rod 32 is not high, the first and second caster wheels 40, 46 are still capable of rotating at different velocities.

When the double wheel caster 10 approaches a certain velocity which would normally have caused one wheel to rotate faster than the other thus resulting in a shimmying effect, the friction fit caused by the fingers 44 prevents one caster wheel from freely rotating at a greater velocity than the other caster wheel. Since the velocity between first and second caster wheels 40, 46 does not greatly vary a shimmying effect does not occur.

Likewise, when the stroller 12 is traveling in an arcuate path, the first and second caster wheels 40, 46 are frictionally engaged with the support rod 32. The friction between the wheels 40, 46 and the support rod 32 is such that it still allows the first and second caster wheels 40, 46 to rotate at separate velocities which allows for smooth turning, but prevents the first and second wheels 40, 46 from rotating at greatly different velocities. By restricting the differential velocity between the first and second wheels 40, 46 the shimmying effect is inhibited.

It will be recognized by those skilled in the art that changes may be made to the above-described double caster wheel without departing from the broad inventive concepts thereof. For example, another embodiment could position the fingers on the radial surface of the first end portion and the second end portion of the support rod and extend radially outward toward the first and second caster wheels, respectively. The fingers would fill the gap between the wheel and the support rod, providing friction to cause the caster wheel to rotate with the support rod. It is understood, therefore, that this invention is not limited to the particular embodiment disclosed, but is intended to cover all modifications which are within the scope and spirit of the invention as defined by the appended claims.

We claim:

1. A double wheel caster for being rotatably mounted on a leg of a transport carrier comprising:

a wheel caster for being mounted on a leg of a transport carrier, said wheel caster including a trailing housing having a generally cylindrical opening extending therethrough at one end thereof;

a support rod having a center portion and opposite first and second end portions, said opening being complementarily sized for rotatably receiving said center portion of said support rod, said center portion of said support rod being rotatably positioned within said opening located in the wheel caster trailing housing;

a first caster wheel having an aperture generally centrally disposed therethrough and rotatably receiving said first end portion of said support rod, said aperture defining a generally cylindrical surface, said first caster wheel being rotatably positioned on said first end portion of said support rod such that a first gap exists between said first end portion of said support rod and said cylindrical surface;

first bushing means positioned within said first ga for frictionally engaging said first end portion of said support rod and said cylindrical surface of said first caster wheel;

a second caster wheel having an aperture generally centrally disposed therethrough and rotatably receiving said second end portion of said support rod, said second caster wheel aperture defining a generally cylindrical surface, said second caster wheel being rotatably positioned on said second end portion of said support rod such that a second gap exists between said second end portion of said support rod and said cylindrical surface; and second bushing means positioned within said second gap for frictionally engaging said second end portion of said support rod and said cylindrical surface of said second caster wheel, whereby upon movement of said transport carrier said first caster wheel, said second caster wheel and said support rod rotate together with respect to the trailing housing, and upon movement of said transport carrier in a direction which forces one caster wheel to rotate faster than the other, said first and second bushing means frictionally inhibit said one caster wheel from freely rotating with respect to the other to thereby prevent shimmying.

2. The double wheel caster as recited in claim 1, wherein said first bushing means comprises a plurality of fingers spaced around said cylindrical surface of said first caster wheel, said fingers extending radially inward and into engagement with said first end portion of said support rod, such that said first caster wheel is frictionally mounted on said first end portion of said support rod.

3. The double wheel caster as recited in claim 2, wherein said fingers are positioned on a portion of said cylindrical surface of said first caster wheel.

4. The double wheel caster as recited in claim 1, wherein said second bushing means comprises a plurality of fingers spaced around said cylindrical surface of said second caster wheel, said fingers extending radially inward and into engagement with said second end portion of said support rod, such that said second caster wheel is frictionally mounted on said second end portion of said support rod.

5. The double wheel caster as recited in claim 4, wherein said fingers are positioned on a portion of said cylindrical surface of said second caster wheel.

6. The double caster wheel as recited in claim 1, wherein said support rod is of generally constant diameter.

7. The double caster wheel as recited in claim 1, wherein said outer surface of said support rod is smooth.

8. The double caster wheel as recited in claim 1 further comprising stop means for retaining said first and second caster wheels on said rod, said stop means being attached to the first end and second end portions of said support rod.

9. A double wheel caster for being rotatably mounted on a leg of a transport carrier comprising:

a wheel caster for being mounted on a leg of a transport carrier, said wheel caster including a trailing housing having a generally cylindrical opening extending therethrough at one end thereof;

a support rod having a center portion and opposite first and second end portions, said opening being complementarily sized for rotatably receiving said center portion of said support rod, said rod having a smooth outer surface and being of constant diameter, said center portion of said support rod being rotatably positioned within said opening located in the wheel caster trailing housing;

a first caster wheel having an aperture generally centrally disposed therethrough and rotatably receiving said first end portion of said support rod, said aperture defining a generally cylindrical surface, said first caster wheel being rotatably positioned on said first end portion of said support rod such that a first gap exists between said first end portion of said support rod and said cylindrical surface;

first bushing means positioned within said first gap for frictionally engaging said cylindrical surface of said first caster wheel and said first end portion of said support rod;

a second caster wheel having an aperture generally centrally disposed therethrough and rotatably receiving said second end portion of said support rod, said second caster wheel aperture defining a generally cylindrical surface, said second caster wheel being rotatably positioned on said second end portion of said support rod such that a second gap exists between said second end portion of said support rod and said second caster wheel cylindrical surface;

second bushing means positioned within said second gap for frictionally engaging said cylindrical surface of said second caster wheel and said second end portion of said support rod, whereby upon movement of said transport carrier said first caster wheel, said second caster wheel and said support rod rotate together with respect to the trailing housing, and upon movement of said transport carrier in a direction which forces one caster wheel to rotate faster than the other, said first and second bushing means frictionally inhibit said one caster wheel from freely rotating with respect to the other to thereby prevent shimmying; and stop means for retaining said first and second caster wheels on said support rod, said stop means attached to the first end and second end of said support rod.

10. The double wheel caster as recited in claim 9, wherein said first bushing means comprises a plurality of fingers spaced around said cylindrical surface of said first caster wheel, said fingers extending radially inward and into engagement with said first end portion of said support rod such that said first caster wheel is frictionally mounted on said first end portion of said support rod.

11. The double wheel caster as recited in claim 9, wherein said second bushing means comprises a plurality of fingers spaced around said cylindrical surface of said second caster wheel, said fingers extending radially inward and into engagement with said second end portion of said support rod such that said second caster wheel is frictionally mounted on said second end portion of said support rod.

12. A transport carrier for carrying and transporting at least one object, said transport carrier comprising:
   carrying means for receiving an object;
   at least three legs, each said leg having a first end portion and a second end portion, each said first end portion of said legs being attached to a portion of said carrying means and extending therefrom;
   at least two double wheel casters correspondingly mounted on said second end portions of at least two of said support legs, each said double wheel caster comprising:
   a trailing housing having a generally cylindrical opening extending therethrough at one end thereof, said trailing housing being mounted on the second end portion of one of the legs of the transport carrier;
   a support rod having a center portion and opposite first and second end portions, said opening being complementarily sized for rotatably receiving said center portion of said support rod, said center portion of said support rod being rotatably positioned within said opening located in the wheel caster trailing housing;
   a first caster wheel having an aperture generally centrally disposed therethrough and rotatably receiving said first end portion of said support rod, said aperture defining a generally cylindrical surface, said first caster wheel being rotatably positioned on said first end portion of said support rod such that a first gap exists between said first end portion of said support rod and said cylindrical surface;
   first bushing means positioned within said first gap for frictionally engaging said cylindrical surface of said first caster wheel and said first end portion of said support rod;
   a second caster wheel having an aperture generally centrally disposed therethrough and rotatably receiving said second end portion of said support rod, said second caster wheel aperture defining a generally cylindrical surface, said second caster wheel being rotatably positioned on said first end portion of said support rod such that a second gap exists between said second end portion of said support rod and said second caster wheel cylindrical surface;
   second bushing means positioned within said second gap for frictionally engaging said cylindrical surface of said second caster wheel and said second end portion of said support rod, whereby upon movement of said transport carrier said first caster wheel, said second caster wheel and said support rod of each double caster wheel rotate together with respect to the corresponding trailing housing, and upon movement of said transport carrier in a direction which forces one caster wheel to rotate faster than the other, said first and second bushing means frictionally inhibit said one caster wheel from freely rotating with respect to the other to thereby prevent shimmying.

13. The double wheel caster as recited in claim 12, wherein said first bushing means comprises a plurality of fingers spaced around said cylindrical surface of said first caster wheel, said fingers extending radially inward and into engagement with said first end portion of said support rod, such that said first caster wheel is frictionally mounted on said first end portion of said support rod.

14. The double wheel caster as recited in claim 12, wherein said second bushing means comprises a plurality of fingers spaced around said cylindrical surface of said second caster wheel, said fingers extending radially inward and into engagement with said second end portion of said support rod, such that said second caster wheel is frictionally mounted on said second end portion of said support rod.

* * * * *